United States Patent [19]

Hirota

[11] Patent Number: 4,490,749
[45] Date of Patent: Dec. 25, 1984

[54] COLOR VIDEO SIGNAL RECORDING AND/OR REPRODUCING SYSTEM

[75] Inventor: Akira Hirota, Chigasaki, Japan

[73] Assignee: Victor Company of Japan, Ltd., Yokohama, Japan

[21] Appl. No.: 322,974

[22] Filed: Nov. 19, 1981

[30] Foreign Application Priority Data

Nov. 22, 1980 [JP] Japan .................. 55-165056
Nov. 22, 1980 [JP] Japan .................. 55-165057

[51] Int. Cl.³ .................................. H04N 9/493
[52] U.S. Cl. .................... 358/320; 358/328; 358/330
[58] Field of Search ........... 358/328, 320, 323, 327, 358/330, 324–326

[56] References Cited

U.S. PATENT DOCUMENTS

| 3,820,154 | 6/1974 | Faroudja et al. | 358/324 |
| 3,918,085 | 11/1975 | Numakura et al. | 358/328 |
| 4,007,482 | 2/1977 | Amari | 358/328 |
| 4,134,126 | 1/1979 | Hirai | 358/328 |

FOREIGN PATENT DOCUMENTS

| 2751285 | 5/1978 | Fed. Rep. of Germany | 358/327 |
| 1477466 | 7/1974 | United Kingdom . | |
| 1461870 | 1/1977 | United Kingdom . | |
| 1497865 | 1/1978 | United Kingdom . | |
| 1506087 | 4/1978 | United Kingdom . | |
| 1522339 | 8/1978 | United Kingdom . | |
| 1535482 | 12/1978 | United Kingdom . | |
| 1557106 | 12/1979 | United Kingdom . | |

Primary Examiner—John C. Martin
Assistant Examiner—Erin A. McDowell
Attorney, Agent, or Firm—Louis Bernat

[57] ABSTRACT

A recording system in a color video signal recording and/or reproducing system comprises a first filter for separating a luminance signal from a color video signal, a modulator for frequency-modulating the luminance signal, a second filter for separating a carrier chrominance signal from the color video signal, a first frequency converter for converting the frequency band of the carrier chrominance signal to a frequency band which is lower than frequencies occupied by the output luminance signal of the modulator, a superimposing circuit for superimposing the output of the frequency modulator and the output of the first frequency converter one on the other, a recording circuit for recording the superimposed signal onto a magnetic recording medium, a first separation circuit for separating a horizontal synchronizing signal from the color video signal, and a first frequency-converting signal forming circuit for forming a frequency-converting signal according to the horizontal synchronizing signal separated at the first separation circuit, to supply the separated horizontal synchronizing signal to the first frequency converter.

3 Claims, 8 Drawing Figures

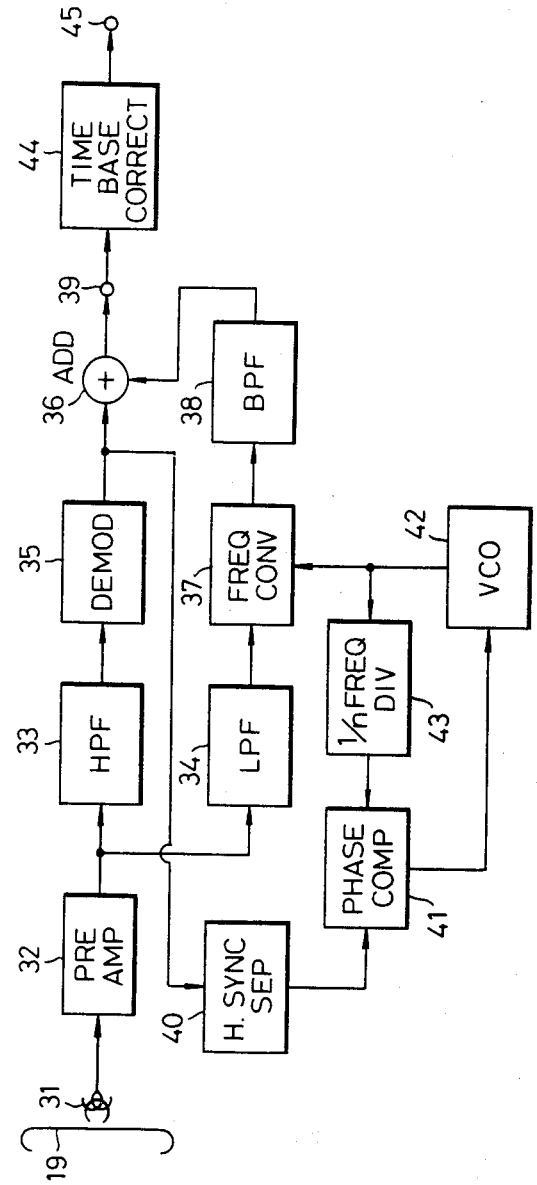

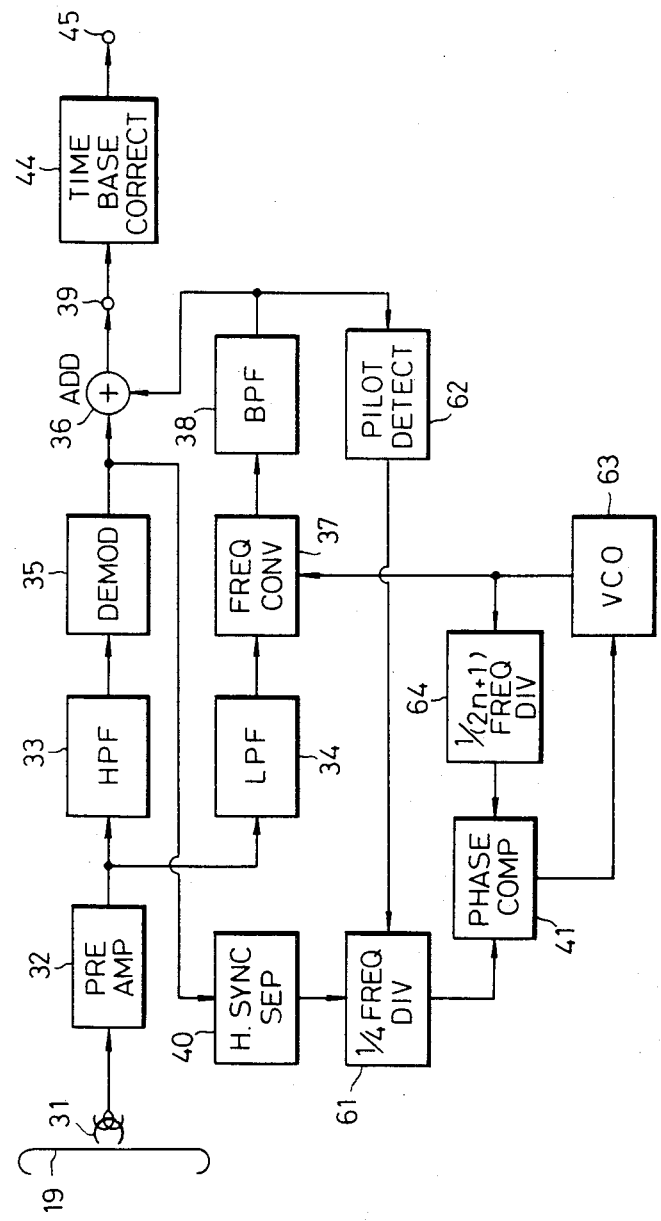

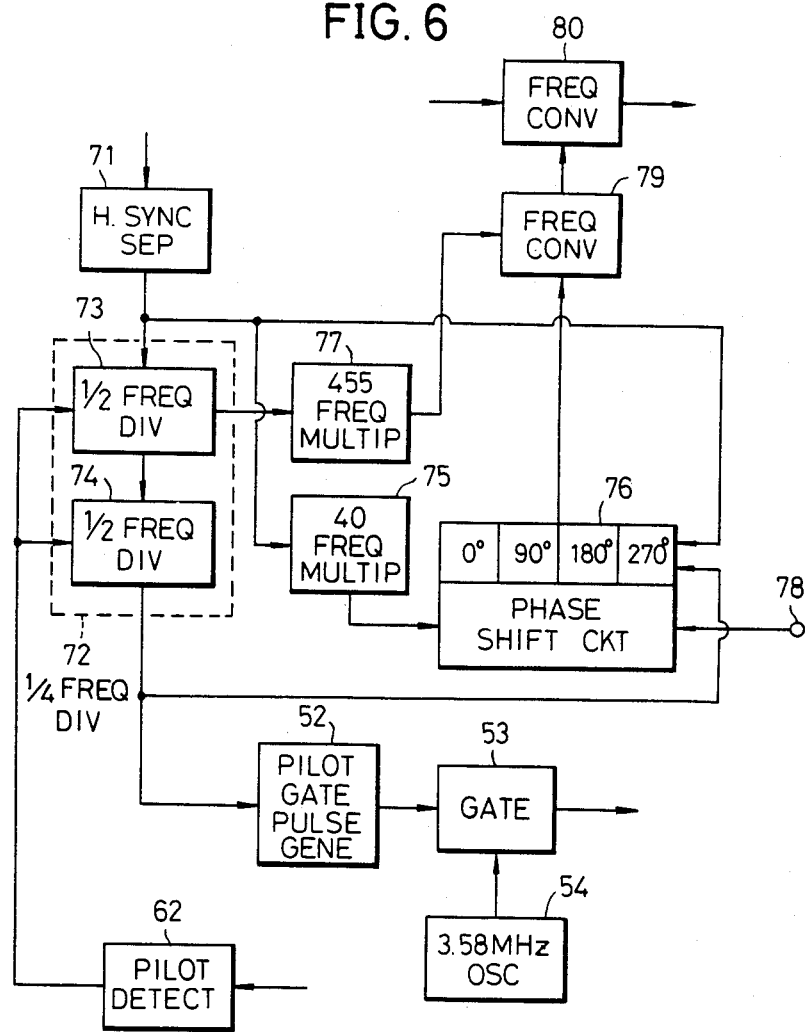

COLOR VIDEO SIGNAL RECORDING AND/OR REPRODUCING SYSTEM

BACKGROUND OF THE INVENTION

The present invention generally relates to color video signal recording and/or reproducing systems. A luminance signal of a composite color video signal comprises the luminance signal and a carrier chrominance signal, which are frequency-modulated. The carrier chrominance signal is frequency-converted into a band which is lower than the band of the frequency-modulated luminance signal. The frequency-modulated luminance signal and the frequency-converted carrier chrominance signal are superimposed and recorded, and then they are reproduced. More particularly, the present invention relates to a system which also records and/or reproduces the luminance signal which originally exists in a band that is identical to the band of the carrier chrominance signal, with the same phase as the luminance signal which exists outside the band of the carrier chrominance signal.

Conventionally, in a portable type color video signal recording and/or reproducing apparatus for home use, a so-called low-band-conversion system (a system in which the carrier chrominance signal is frequency-converted into a lower frequency band, and in the present application, the carrier chrominance signal thus frequency-converted into the lower frequency band will be referred to as a low-band-converted carrier chrominance signal) is used so as to effectively record and/or reproduce the color video signal, since the band in which recording and/or reproduction can be performed in the above portable type apparatus is narrow. In this low-band-conversion system, a luminance signal within a band excluding that of the carrier chrominance signal is extracted from a composite color video signal consisting of the luminance signal and the carrier chrominance signal and frequency-modulated. Moreover, the carrier chrominance signal is extracted from the above composite color video signal and frequency-converted into a band lower than that of the frequency-modulated luminance signal. These frequency-modulated luminance signal and frequency-converted carrier chrominance signal are superimposed, and then recorded and reproduced. A color video signal recording and reproducing system using the above low-band-conversion system is described in detail, in a U.S. Pat. No. 3,715,468 in which the assignee is the same as that of the present application.

In the composite color video signal, the carrier chrominance signal exists at a high frequency part of the luminance signal by use of frequency interleaving system. Hence, the luminance signal exists within a band of the carrier chrominance signal which is frequency-converted and recorded and reproduced. According to the conventional system, when the frequency of the carrier chrominance signal which is frequency-converted into the low band is returned to the original frequency (3.58 MHz in the case of the NTSC system) in the reproducing system, a signal for frequency-conversion obtained from a local oscillator is used. This local oscillator accurately produces a signal having a constant frequency.

However, when recording and reproducing a signal onto and from a magnetic tape, time base error is generally introduced due to wow and flutter in the magnetic tape travel. Accordingly, the demodulated luminance signal includes time base error, and the phase of the demodulated luminance signal and the phase of the luminance signal within the band of the restored carrier chrominance signal which is frequency-converted, does not become matched. Hence, the luminance signal within the band of the carrier chrominance signal does not contribute to the improvement of the resolution, and the resolution is determined by the luminance signal which is recorded and reproduced in the above band-limited state. Therefore, the luminance signal is not used effectively in the conventional system, and there was a disadvantage in that the resolution is inferior.

SUMMARY OF THE INVENTION

Accordingly, it is a general object of the present invention to provide a novel and useful color video signal recording and/or reproducing system.

Another and more specific object of the present invention is to provide a color video signal recording and/or reproducing system which effectively uses a luminance signal component within a band of a carrier chrominance signal which is frequency-converted and recorded and reproduced. According to the system of the present invention, not only the sole component of the luminance signal which is frequency-modulated and recorded and reproduced, but also the luminance signal component within the band of the carrier chrominance signal is used, to obtain an exceedingly high resolution.

Still another object of the present invention is to provide a color video signal recording and/or reproducing system in which, during recording and reproduction to achieve the above object of the present invention, the frequency of a frequency-converting signal used for frequency-converting the carrier chrominance signal is selected so that a modulation distortion component introduced during the recording process of the frequency-modulated luminance signal and the low-band-converted carrier chrominance signal does not appear in the reproduced picture as beat and moire.

Other objects and further features of the present invention will be apparent from the following detailed description when read in conjunction with the accompanying drawings.

BRIEF DESCRIPTION OF THE DRAWINGS

FIG. 3 is a systematic block diagram showing a reproducing system corresponding to the recording system shown in FIG. 1;

FIG. 5 is a systematic block diagram showing a reproducing system corresponding to the recording system shown in FIG. 4; and FIG. 6 is a systematic block diagram showing a third embodiment of a color video signal recording and/or reproducing system according to the present invention.

DETAILED DESCRIPTION

Figure 2A:
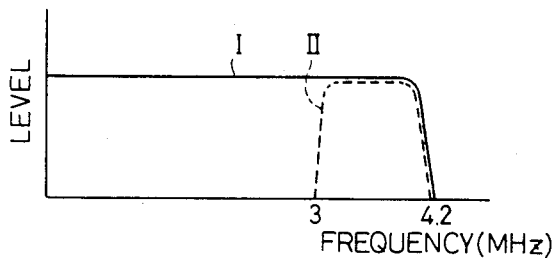
FIGS. 2A, 2B, and 2C are diagrams respectively showing frequency spectrums of signals at each part of the block system shown in FIG. 1.
Figure 2B:
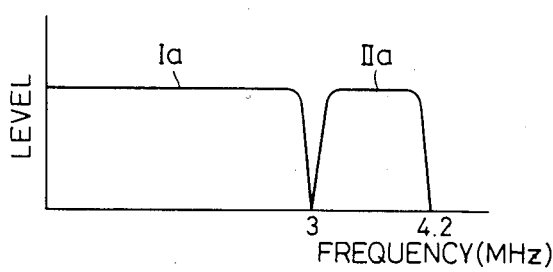

First, description will be given with respect to a first embodiment of a recording system according to the present invention. A composite color video signal of a standard system (such as the NTSC system, and the PAL system, for example, and in the present embodiment of the invention, description will be given with respect to the NTSC system) which is applied to an input terminal 11, is supplied to a lowpass filter 12 and a bandpass filter 13. As indicated in FIG. 2A, the above input composite color video signal consists of a luminance signal I occupying a band between zero and 4.2 MHz, and a carrier chrominance signal II occupying a band between 3 MHz and 4.2 MHz existing with respect to the luminance signal I by use of the frequency interleaving. The lowpass filter 12 has a pass band of zero to 3 MHz, and only a luminance signal Ia occupying a band between zero and 3 MHz as indicated in FIG. 2B is filtered through the lowpass filter 12, and supplied to a frequency modulator 14. A luminance signal Ib indicated in FIG. 2C which is obtained as a result of the frequency modulation performed at the frequency modulator 14, is supplied to an adder 15.

Figure 2C:
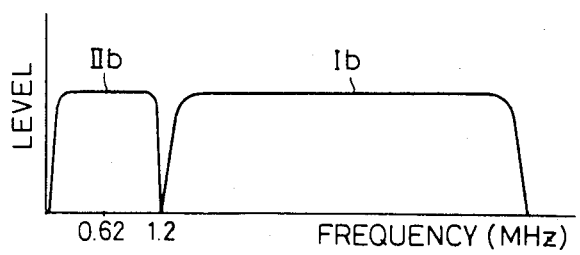

The bandpass filter 13 has a pass band of 3 MHz to 4.2 MHz. A carrier chrominance signal IIa indicated in FIG. 2B which has passed through the bandpass filter 13, is supplied to a frequency converter 16 wherein the signal is frequency-converted by a frequency-converting signal obtained from a local oscillator 22. Accordingly, a low-band-converted carrier chrominance signal (a carrier chrominance signal which is frequency-converted into a lower band) IIb having a center frequency of 620 kHz as indicated in FIG. 2C, is obtained from the above frequency converter 16. This carrier chrominance signal IIb is passed through a lowpass filter 17 having a pass band of zero to 1.2 MHz and eliminated of unwanted components, and then supplied to the adder 15. Hence, the carrier chrominance signal IIb obtained through the lowpass filter 17 is added with the above frequency-modulated luminance signal Ib and multiplexed. Since the carrier chrominance signal IIb exists within a band lower than that of the frequency-modulated luminance signal, the band can be used effectively without introducing inconveniences. The above multiplexed signal is recorded onto a magnetic tape 19 by use of a rotary magnetic head 18. The above parts of the recording system are the same as those of the conventional system. On the other hand, the following block systems are added in the system according to the present invention.

The composite color video signal obtained through the input terminal 11, is also supplied to a horizontal synchronizing signal separation circuit 20 wherein the horizontal synchronizing signal is separated. The separated horizontal synchronizing signal is supplied to a phase comparator 21. On the other hand, the frequency of an oscillation output signal of the local oscillator 22 is frequency-divided into 1/n (n is an integer) the original frequency at a 1/n-frequency divider 23, and then supplied to the phase comparator 21. The phases of the above horizontal synchronizing signal and the frequency-divided signal are compared at the phase comparator 21, and a phase compared error output is supplied to the local oscillator 22 to control the oscillating operation of the local oscillator 22.

The oscillation output of the local oscillator 22 which is thus controlled, is supplied to the frequency converter 16 and used as the frequency-converting signal as described above. The luminance signal also exists within the band of the carrier chrominance signal IIa by use of the frequency interleaving. However, since the local oscillator 22 is controlled as described above, the luminance signal which is recorded and reproduced independently, and the luminance signal which is recorded and reproduced together with the carrier chrominance signal, maintain a constant phase relationship with each other.

Next, description will be given with respect to a reproducing system for reproducing the signal recorded in the manner described above, by referring to FIG. 3. A signal recorded in the above described manner is reproduced from the magnetic tape 19 by use of a rotary magnetic head 31. The reproduced signal is supplied to a highpass filter 33 and a lowpass filter 34, through a preamplifier 32. The lower limit cutoff frequency of the highpass filter 33 is 1.2 MHz. The frequency-modulated luminance signal Ib which is filtered at the above highpass filter 33 is demodulated at a demodulator 35, and supplied to an adder 36 as the luminance signal Ia.

The pass band of the lowpass filter 34 is zero to 1.2 MHz. The frequency-converted carrier chrominance signal IIb which passes through the above lowpass filter 34, is supplied to a frequency converter 37 wherein the signal IIb is frequency-converted by a frequency-converting signal obtained from a voltage controlled oscillator (VCO) 42. Accordingly, the frequency-converted carrier chrominance signal IIb is restored to the carrier chrominance signal IIa of the original band, having a chrominance subcarrier frequency of 3.58 MHz. This carrier chrominance signal IIa is eliminated of unwanted components as a bandpass filter 38 having a pass band of 3 MHz to 4.2 MHz. The carrier chrominance signal IIa obtained through the bandpass filter 38 is supplied to the adder 36, and added with the above luminance signal Ia. The above described parts of the reproducing system is the same as those of the conventional system. On the other hand, the following block systems are added in the system according to the present invention.

The output demodulated luminance signal of the demodulator 35, is also supplied to a horizontal synchronizing signal separation circuit 40 wherein the horizontal synchronizing signal is separated.

The separated horizontal synchronizing signal is supplied to a phase comparator 41. On the other hand, the frequency of the oscillation output signal of the VCO 42 is frequency-divided into 1/n the original frequency at a 1/n-frequency divider 43, and then supplied to the phase comparator 41. The phases of the above horizontal synchronizing signal and the frequency-divided signal are compared at the phase comparator 41, and a phase compared error output is supplied to the VCO 42 to control the oscillating operation of the VCO 42.

The oscillation output of the VCO 42 which is thus controlled, is supplied to the frequency converter 37 and used as the frequency-converting signal as described above. The luminance signal existing within the band of the carrier chrominance signal IIa has the same phase relationship with the luminance signal which is recorded and reproduced independently and the luminance signal which is recorded and reproduced together with the carrier chrominance signal. Accordingly, the luminance signal within the reproduced composite color video signal obtained from the adder 36 through a terminal 39, can effectively occupy a common band to use the band together with the carrier chrominance signal as indicated by I in FIG. 2A.

In the conventional system, the phase of the reproduced luminance signal existing in the band IIa of the carrier chrominance signal is shifted from the phase of the reproduced luminance signal in the band Ia. Hence, the luminance signal within the band IIa could not be used, and as a result, the frequency spectrum of the reproduced signal became as indicated in FIG. 2B. There accordingly was a disadvantage in that the resolution was low. However, in the system according to the present invention, the luminance signal within the band IIa can effectively be used. Therefore, the frequency spectrum of the reproduced signal becomes as indicated in FIG. 2A in which the band of the luminance signal is wide, and the resolution is thus improved.

In the above embodiment of the invention, the input chrominance subcarrier frequency is 3.579545 MHz, and in this case, the above system may be realized by selecting the frequency-dividing ratio n of the 1/n-frequency dividers 23 and 43 at 267, the oscillation frequency of the local oscillator 22 at 4.201048 MHz, and the center frequency of the low-band-converted carrier chrominance signal at 621.503 kHz.

According to the above system of the present invention, the oscillation frequency of the VCO 42 which produces the frequency-converting signal varies according to the time base deviation in the horizontal synchronizing signal within the reproduced signal. Thus, the reproduced carrier chrominance signal is subjected to the time-axis deviation. Hence, the composite color video signal obtained from the terminal 39 is corrected of the total time base deviation at a time base corrector 44. This time base corrector 44 is constructed from a known charge-coupled device (CCD), for example, and is low in cost. Therefore, as a result, a composite color video signal having no time base deviation is obtained through an output terminal 45.

Here, the output signal frequency of the local oscillator 22 is designated as $f_e$, the chrominance subcarrier frequency of the NTSC system color video signal as $f_s$, the carrier frequency of the frequency-modulated signal as $f_c$ and the chrominance subcarrier frequency of the frequency-converted carrier chrominance signal as $f_o$ ($=f_e-f_s$), respectively.

The magnetic tape recorded with and reproduced of the two signals respectively having frequencies of $f_c$ and $f_o$ includes third-order distortion. Here, amplitudes of the signals are respectively designated as $K_1$ and $K_2$. Various frequency components are obtained by calculations based on developing a formula, $(K_1 \cos 2\pi f_c t = K_2 \cos 2\pi f_o t)^3$. Of these, frequency components, such components as $3f_c$, $3f_o$, $f_c \pm 2f_o$ and $2f_c \pm f_o$, are unnecessary components.

Of these unnecessary components, the frequency component $3f_c$ does not become a disturbing component because it normally exists outside a frequency-modulated wave band. The frequency components other than the component $3f_c$ produce beat disturbances because they normally exist inside the frequency-modulated wave band. The beat disturbances degrade the quality of the reproduced picture. When these frequency components are demodulated, they become disturbing signals having a frequency equal to the difference between the frequency-modulated carrier wave and the frequency components, due to a characteristic of the frequency modulated signal. Accordingly, the frequencies of the disturbing signals which are frequency demodulated are $(f_c - 3f_o)$, $2f_o$ and $(f_c \pm f_o)$, respectively.

Actually, the frequency $f_c$ is a frequency-modulated luminance signal and, accordingly, is not a single frequency but a frequency which is always changing. The frequency $f_o$; is the frequency of the chrominance subcarrier signal of the frequency-converted carrier chrominance signal therefore, it is a constant frequency. As a result, the frequency components $(f_c - 3f_o)$ and $(f_c \pm f_o)$ out of the disturbing signal frequency components are always changing together with the changing frequency $f_c$. Therefore, these components do not produce such a conspicuous disturbing effect on the reproduced picture. However, the frequency component $2f_o$ is relatively conspicuous on the reproduced picture because it is a constant frequency.

Now, the frequency of the horizontal synchronizing signal is designated as $f_H$. A frequency which is obtained by multiplying $f_H/2$ by an odd number is relatively inconspicuous because it is cancelled in between the horizontal scanning lines. Accordingly, if the frequency $f_o$ is selected to be a frequency which is $f_H/4 \times (2k+1)$ (where k is integer), the beat disturbance will become least conspicuous.

However, in the above embodiment of the invention, the oscillation frequency $f_e$ of the local oscillator 22 is equal to $n \cdot f_H$, and is an even number multiple of the frequency $f_H/4$. Here, since the chrominance subcarrier frequency $f_s$ is selected to a frequency which is an odd number multiple of the frequency $f_H/2$, the frequency $f_s$ becomes a frequency which is an even number multiple of the frequency $f_H/4$. Accordingly, the frequency-converted chrominance subcarrier frequency $f_o$ ($=f_e-f_s$) is a frequency obtained by performing subtraction between the even number multiple frequencies of the frequency $f_H/4$, and as a result is an even number multiple frequency of the frequency $f_H/4$. Hence, in the above described embodiment of the invention, the frequency-modulated luminance signal and the frequency-converted chrominance subcarrier appear in the picture as beat (moire) wherein the modulation distortion component is conspicuous, upon recording and reproducing process. Therefore, there is a disadvantage in that the picture quality is degraded.

Figure 1:
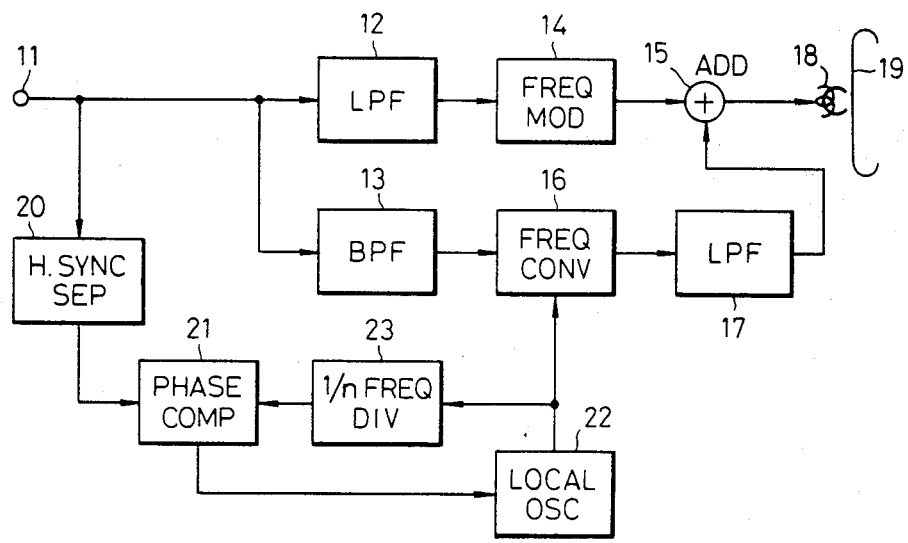
FIG. 1 is a systematic block diagram showing a first embodiment of a recording system in a color video signal recording and/or reproducing system according to the present invention.
Figure 4:
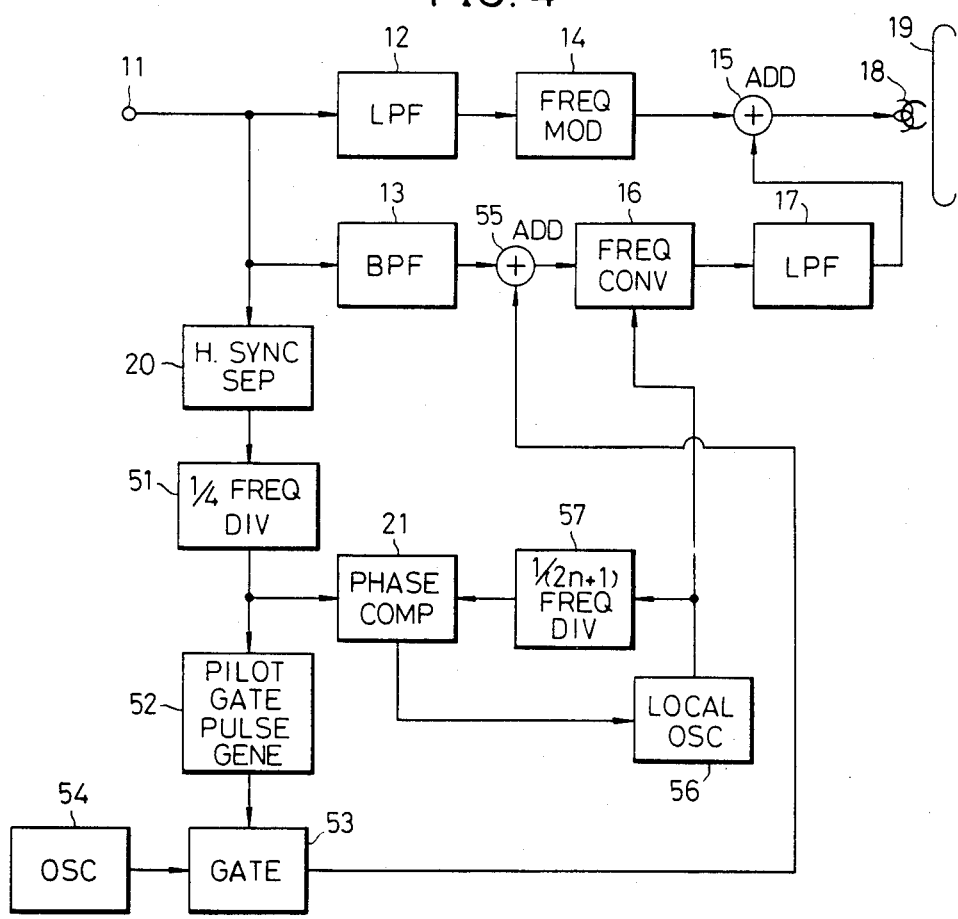
FIG. 4 is a systematic block diagram showing a second embodiment of a recording system in a color video signal recording and/or reproducing system according to the present invention.

Accordingly, description will now be given with respect to an embodiment of the invention in which the above described disadvantage has been eliminated. FIG. 4 shows a second embodiment of a recording system in a recording and/or reproducing system according to the present invention. In FIG. 4, those parts which are the same as those corresponding parts in FIG. 1 are designated by like reference numerals, and their description will be omitted.

The horizontal synchronizing signal separated at the horizontal synchronizing signal separation circuit 20 is supplied to a ¼-frequency divider 51 wherein the frequency $f_H$ of the horizontal synchronizing signal is frequency-divided into ¼ the original frequency. The frequency-divided horizontal synchronizing signal is supplied to the phase comparator 21 and a pilot gate pulse generator 52. A pilot gate pulse generated by the above pilot gate pulse generator 52 is supplied to a gate circuit 53, to perform a gating operation with respect to a signal having a frequency of 3.58 MHz obtained from an oscillator 54. Here, the frequency of the pilot gate pulse is ¼ the frequency of the horizontal synchronizing signal. Accordingly, a signal is obtained from the gate circuit 53 for every four horizontal synchronizing signals, that is, a signal is obtained for every four horizontal scanning periods (4H period), and this signal is supplied to an adder 55 as a pilot signal.

The carrier chrominance signal obtained from the lowpass filter 13 is supplied to the adder 55, and added with the pilot signal which is obtained at a rate of one for every 4H period from the gate circuit 53. At this point in time, the above pilot signal is superimposed and inserted in front of or at a suitable position after a color burst signal within a horizontal blanking period for every 4H period, or into the horizontal synchronizing signal. The output signal of the adder 55 is supplied to the frequency converter 16 wherein the output signal is frequency-converted by an oscillation signal from a local oscillator 56.

An output signal of the local oscillator 56 is supplied to a 1/(2n+1)-frequency divider 57 wherein the frequency of the signal is frequency-divided into 1/(2n+1) the original frequency. The phase of the frequency-divided output of the local oscillator 56 is supplied to the phase comparator 21 and compared with the phase of the signal having a frequency of $1/4 f_H$ which is obtained from the ¼-frequency divider 51. The local oscillator 56 is applied with an output error signal from the phase comparator 21. Thus, the phase of the output frequency signal produced by the local oscillator 56 is locked with the phase of the horizontal synchronizing signal with a rate of one for four horizontal synchronizing signals.

The magnetic tape 19 which is recorded by the recording system shown in FIG. 4, is reproduced by a reproducing system shown in FIG. 5. In FIG. 5, those parts which are the same as those corresponding parts in FIG. 3 are designated by like reference numerals, and their description will be omitted.

The output of the demodulator 35 is supplied to the adder 36, and also to the horizontal synchronizing signal separation circuit 40 wherein the horizontal synchronizing signal is separated. The separated horizontal signal is supplied to a ¼-frequency divider 61 wherein the frequency of the signal is frequency-divided into ¼ the original frequency.

On the other hand, the carrier chrominance signal which has passed through the bandpass filter 38 is supplied to the adder 36 and a pilot signal detection circuit 62, and a pilot signal existing for every 4H period is detected. This pilot signal is supplied to the ¼-frequency divider 61 as a reset signal, to reset the ¼-frequency divider 61. Hence, the ¼-frequency divider 61 performs a ¼-frequency-dividing operation in synchronism with the above pilot signal.

The output of the ¼-frequency divider 61 is supplied to the phase comparator 41 wherein the phase of the above output is compared with the phase of a signal from a voltage controlled oscillator (VCO) 63 which is frequency-divided at a 1/(2n+1)-frequency divider 64. The VCO 63 is controlled of the oscillation by the phase compared error output obtained from the phase comparator 41.

As described above, the frequency-dividing operation of the ¼-frequency divider 61 is in synchronism with the pilot signal. Accordingly, the phase of the frequency-converting signal obtained from the VCO 63 which is supplied to the frequency converter 37, coincides with that upon recording, and is of a constant phase relationship with the luminance signal.

In the above embodiment of the invention, the oscillation frequency $f_e$ of the local oscillator 56 and the VCO 63 is $f_H/4 \cdot (2n+1)$, and is a frequency which is an odd number multiple of the frequency $f_H/4$. Moreover, the chrominance subcarrier frequency $f_s$ is an odd number multiple of the frequency $f_H/2$, that is, an even number multiple of the frequency $f_H/4$. However, the chrominance subcarrier frequency $f_o$ of the frequency-converted carrier chrominance signal is obtained by a subtraction performed between the frequency $f_e$ which is an odd number multiple of the frequency $f_H/4$, and the frequency $f_s$ which is an even number multiple of the frequency $f_H/4$. Hence, the above chrominance subcarrier frequency $f_o$ becomes a frequency which is an odd number multiple of the frequency $f_H/4$, that is, $f_H/4 \cdot (2k+1)$ where k is an integer. Therefore, according to the present embodiment of the invention, beat and moire are not introduced in the reproduced picture, and a reproduced picture of high quality can be obtained.

As an example, in a case where the horizontal synchronizing signal frequency $f_H$ and the chrominance subcarrier frequency $f_s$ are 15.75 kHz and 3.579545 MHz, respectively, the output signal frequency $f_e$ of the local oscillator 56 (VCO 63) and the frequency-converted carrier chrominance signal frequency become 4.212849 MHz and 633.304 kHz, respectively.

Next, description will be given with respect to an embodiment wherein a system according to the present invention is applied to a so-called phase shift system color video signal recording and/or reproducing system disclosed in a U.S. Pat. No. 4,178,606 in which the assignee is the same as that of the present application, by referring to FIG. 6. In FIG. 6, those parts which are the same as those corresponding parts in FIGS. 4 and 5 are designated by like reference numerals, and their description will be omitted.

The horizontal synchronizing signal separated at a synchronizing signal separation circuit 71 corresponding to the horizontal synchronizing signal separation circuits 20 and 40, is supplied to a ½-frequency divider 73 within a ¼-frequency divider 72 corresponding to the ¼-frequency dividers 51 and 61, and also supplied to a 40-times frequency multiplier 75 and a phase shifting circuit 76. The frequency-divided signal obtained through the ½-frequency divider 73 is supplied to a 455-times frequency multiplier 77 on one hand wherein the frequency is multiplied by 455 and then supplied to a frequency converter 79. On the other hand, the above frequency-divided signal obtained through the ½-frequency divider 73 is supplied to the ½-frequency divider 74 wherein the frequency is further frequency-divided into ½, and then supplied to the pilot gate pulse generator 52 and the phase shifting circuit 76.

The phase shifting circuit 76 forms phase-shifted signals by phase-shifting the signal obtained from the 40-times frequency multiplier 75 by 0°, 90°, 180°, and 270°. Hence, the phase shifting circuit 76 supplies a signal which is successively phase-shifted by 0°, 90°, 180°, and 270° for every 1H period to the frequency converter 79, by using the horizontal synchronizing signal from the horizontal synchronizing signal separation circuit 71 as a switching signal. Moreover, the direction of the phase shift is alternately changed over by a drum pulse generated according to the rotation of the rotary magnetic heads, which is supplied through a terminal 78. When one magnetic head is recording a track on the magnetic tape, the direction of the phase shift is 0°, 90°, 180°, and 270°, and when the other magnetic head is recording a succeeding track of the magnetic tape, the direction of the phase shift is changed over to the opposite direction. Furthermore, the phase shifting circuit 76 is reset by the signal from the ¼-frequency divider 74, so that the phase shift is always 0° when the pilot signal is inserted.

The output signal of the phase shifting circuit 76 is frequency-converted by the signal from the 455-times frequency multiplier 77, at the frequency converter 79. This frequency-converted signal is supplied to a frequency converter 80 corresponding to the frequency converters 16 and 37, as a frequency-converting signal having a predetermined frequency and which is phase-shifted by 90° for every 1H period, to frequency-convert the carrier chrominance signal.

In addition, during a reproducing mode, the phase shifting circuit 76 reverses the direction of the phase shift from that upon recording, to restore the shifted phase of the carrier chrominance signal to the original phase. The pilot signal detection circuit 62 detects the pilot signal, and the detected pilot signal resets the ½-frequency dividers 73 and 74.

Further, the present invention is not limited to these embodiments, but various variations and modifications may be made without departing from the scope of the present invention.

What is claimed is:

1. A color video signal recording system comprising:
   first filter means for separating a luminance signal from a color video signal;
   modulator means for frequency-modulating said luminance signal;
   second filter means for separating a carrier chrominance signal from said color video signal;
   first frequency converting means for converting the frequency band of the carrier chrominance signal to a frequency band which is lower than frequencies occupied by the luminance signal output of said modulator means;
   superimposing means for superimposing the output of said modulator means and the output of said first frequency converting means;
   recording means for recording the output of the first superimposing means onto a magnetic recording medium;
   first separation means for separating a horizontal synchronizing signal from said color video signal;
   first frequency-converting signal forming means for forming a frequency-converting signal responsive to the horizontal synchronizing signal which is separated in said first separation means, the frequency-converting signal being supplied to said first frequency converting means, said first frequency-converting signal forming means comprising a first local oscillator means for supplying the frequency-converting signal to said first frequency converting means, first frequency dividing means for frequency-divding the output of said first local oscillator, first phase comparing means for comparing the phases of said separated horizontal synchronizing signal and said frequency-divided output signal of said first frequency dividing means and for controlling said first local oscillator by supplying an error output signal produced by said first phase comparing means, and second frequency dividing means for frequency-dividing the frequency of said separated horizontal synchronizing signal into ¼ the original frequency and for supplying the frequency-divided signal to said phase comparing means, the frequency-dividing ratio of said first frequency dividing means being 1/(2n+1) where n is an integer;
   generating means for generating a reference frequency signal;
   pilot gate pulse generating means for generating a pilot gate pulse from the output of said second frequency dividing means;
   gating means responsive to said pilot gate pulse for gating said generated reference frequency signal; and
   means for superimposing said gated signal as a pilot signal into the carrier chrominance signal which is separated in said second filter means.

2. A system for reproducing signals recorded by a recording system comprising:
   first filter means for separating a luminance signal from a color video signal;
   modulator means for frequency-modulating said luminance signal;
   second filter means for separating a carrier chrominance signal from said color video signal together with the luminance signal which exists in a frequency band which is identical to the frequency band of the carrier chrominance signal;
   first frequency converting means for converting the frequency band of the carrier chrominance signal to a frequency band which is lower than frequencies occupied by the output luminance signal of said modulator means;
   first superimposing means for superimposing the output of said frequency modulator means and the output of said first frequency converting means;
   recording means for recording the output of said superimposing means onto a magnetic recording medium;
   first separation means for separating a horizontal synchronizing signal from said color video signal; and
   first frequency-converting signal forming means for forming a frequency-converting signal according to the horizontal synchronizing signal which is separated in said first separation means, the frequency-converting signal being supplied to said first frequency converting means,
   said first frequency-converting signal forming means comprising a first local oscillator for supplying the frequency-converting signal to said first frequency converting means, first frequency dividing means for frequency-dividing the output of said first local oscillator, and first phase comparing means for comparing the phases of said separated horizontal synchronizing signal and said frequency-divided output signal of said first frequency dividing means and for controlling said first local oscillator by an output error signal produced therefrom so that a constant phase relationship is maintained between the luminance signal which is recorded independently and the luminance signal which is recorded together with the carrier chrominance signal,
   said reproducing system comprising:
   reproducing means for reproducing the recorded signal from said recording medium;
   third filter means for separating the frequency-modulated luminance signal from the reproduced signal;

demodulator means responsive to said third filter means for demodulating the separated luminance signal;

fourth filter means for separating the frequency-converted carrier chrominance signal and the luminance signal which was recorded together with the frequency-converted carrier chrominance signal from said reproduced signal;

second frequency converting means for restoring the frequency band of said filtered carrier chrominance signal to the original frequency band;

second superimposing means for superimposing the output of said demodulator means and the output of said second frequency converting means and for producing a reproduced composite color video signal;

second separation means for separating the horizontal synchronizing signal from said demodulated luminance signal; and second frequency-converting signal forming means for forming a frequency-converting signal responsive to the horizontal synchronizing signal which is separated in said second separation means, to supply the frequency-converting signal to said second frequency means so that a constant phase relationship is maintained between the luminance signal which is separated independently and the luminance signal which is separated together with the carrier chrominance signal, said second frequency-converting signal forming means comprising a second local oscillator for supplying the frequency-converting signal to said second frequency converting means, second frequency dividing means for frequency-dividing the output of said second local oscillator, and second phase comparing means for comparing the phases of said separated horizontal synchronizing signal and said frequency-divided output signal of said second local oscillator and for controlling said second local oscillator by an output error signal produced therefrom, said first frequency-converting signal forming means further having third frequency dividing means for frequency-dividing the frequency of said separated horizontal synchronizing signal into ¼ the original frequency and for supplying the frequency-divided signal to said first phase comparing means, the frequency-dividing ratio of said first frequency dividing means being $1/(2n+1)$ where n is an integer, said second frequency-converting signal forming means further having fourth frequency dividing means for frequency-dividing the frequency of said separated horizontal synchronizing signal from said second separation means into ¼ the original frequency and for supplying the frequency-divided signal to said second phase comparing means, and the frequency-dividing ratio of said second frequency dividing means being $1/(2n+1)$ where n is an integer.

3. A system for reproducing a signal which is recorded by a recording system comprising:

first filter means for separating a luminance signal from a color video signal;

modulator means for frequency-modulating said luminance signal;

second filter means for separating a carrier chrominance signal from said color video signal;

first frequency converting means for converting the frequency band of the carrier chrominance signal to a frequency band which is lower than frequencies occupied by the output luminance signal of said modulator means;

superimposing means for superimposing the output of said modulator means and the output of said first frequency converting means;

recording means for recording the superimposed signal onto a magnetic recording medium;

first separation means for separating a horizontal synchronizing signal from said color video signal;

first frequency-converting signal forming means for forming a frequency-converting signal according to the horizontal synchronizing signal which is separated in said first separation means, the frequency-converting signal being supplied to said first frequency converting means, said first frequency-converting signal forming means comprising a first local oscillator for supplying the frequency-converting signal to said first frequency converting means, first frequency dividing means for frequency-dividing the output of said first local oscillator, first phase comparing means for comparing the phases of said separated horizontal synchronizing signal and said frequency-divided output signal of said first frequency dividing means and for controlling said first local oscillator responsive to an error output signal produced by said first phase comparing means, and second frequency dividing means for frequency-dividing the frequency of said separated horizontal synchronizing signal into ¼ the original frequency and for supplying the frequency-divided signal to said first phase comparing means, the frequency-dividing ratio of said first frequency dividing means being $1/(2n+1)$ where n is an integer;

generating means for generating a reference frequency signal;

pilot gate pulse generating means for generating a pilot gate pulse in response to the output of said second frequency dividing means;

gating means responsive to said formed pilot gate pulse for gating said generated reference frequency signal; and means for superimposing said gated signal as a pilot signal into the carrier chrominance signal which is separated in said second filter means, said reproducing system comprising:

reproducing means for reproducing the recorded signal from said recording medium;

third filter means for separating the frequency-modulated luminance signal from the reproduced signal;

demodulator means responsive to said third filter means for demodulating the separated luminance signal;

fourth filter means for separating the frequency-converted carrier chrominance signal from said reproduced signal;

second frequency converting means for restoring the frequency band of said filtered carrier chrominance signal to the original frequency band;

second separation means for separating the horizontal synchronizing signal from said demodulated luminance signal;

second frequency-converting signal forming means for forming a frequency-converting signal responsive to the horizontal synchronizing signal which is separated in said second separation means to supply the frequency-converting signal to said second frequency converting means;

said second frequency-converting signal forming means comprising a second local oscillator for supplying the frequency-converting signal to said second frequency converting means, third frequency dividing means for frequency-dividing the output of said second local oscillator, second phase comparing means for comparing the phases of said separated horizontal synchronizing signal and said frequency-divided output signal of said second local oscillator and for controlling said second local oscillator responsive to an error output signal produced by said second phase comparing means, and fourth frequency dividing means for frequency-dividing the frequency of said separated horizontal synchronizing signal from said second separation means into ¼ the original frequency and for supplying the frequency-divided signal to said second phase comparing means, the frequency-dividing ratio of said third frequency dividing means being $1/(2n+1)$ where n is an integer; and means for detecting said pilot signal from the output carrier chrominance signal of said second frequency converting means, said detected pilot signal being supplied to said fourth frequency dividing means to reset the frequency-dividing operation.

* * * * *

UNITED STATES PATENT AND TRADEMARK OFFICE
CERTIFICATE OF CORRECTION

PATENT NO. : 4,490,749

DATED : December 25, 1984

INVENTOR(S) : Akira Hirota

It is certified that error appears in the above-identified patent and that said Letters Patent is hereby corrected as shown below:

Claim 2, Column 11, line 25, between "frequency" and "means" insert --converting--.

Signed and Sealed this

Twentieth Day of August 1985

[SEAL]

Attest:

DONALD J. QUIGG

*Attesting Officer*  *Acting Commissioner of Patents and Trademarks*